United States Patent
Park et al.

(10) Patent No.: US 12,051,800 B2
(45) Date of Patent: Jul. 30, 2024

(54) NEGATIVE ELECTRODE ACTIVE MATERIAL, NEGATIVE ELECTRODE INCLUDING NEGATIVE ELECTRODE ACTIVE MATERIAL, SECONDARY BATTERY INCLUDING NEGATIVE ELECTRODE, AND METHOD FOR PREPARING NEGATIVE ELECTRODE ACTIVE MATERIAL

(71) Applicant: LG Energy Solution, LTD., Seoul (KR)

(72) Inventors: Semi Park, Daejeon (KR); Sun Young Shin, Daejeon (KR); Ilgeun Oh, Daejeon (KR); Su Min Lee, Daejeon (KR); Yong Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/885,732

(22) Filed: Aug. 11, 2022

(65) Prior Publication Data
US 2023/0065154 A1    Mar. 2, 2023

(30) Foreign Application Priority Data
Aug. 13, 2021 (KR) .................. 10-2021-0107518
Jan. 20, 2022 (KR) .................. 10-2022-0008538

(51) Int. Cl.
*H01M 4/36* (2006.01)
*H01M 4/48* (2010.01)
*H01M 4/583* (2010.01)
*H01M 4/02* (2006.01)

(52) U.S. Cl.
CPC ............ *H01M 4/366* (2013.01); *H01M 4/48* (2013.01); *H01M 4/583* (2013.01); *H01M 2004/021* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | |
|---|---|---|
| 2014/0057176 A1 | 2/2014 | Park et al. |
| 2017/0162868 A1 | 6/2017 | Kim et al. |
| 2017/0187032 A1 | 6/2017 | Chang et al. |

(Continued)

FOREIGN PATENT DOCUMENTS

| | | |
|---|---|---|
| JP | 2020-518962 A | 6/2020 |
| KR | 10-2014-0026855 A | 3/2014 |

(Continued)

*Primary Examiner* — Tracy M Dove
(74) *Attorney, Agent, or Firm* — Birch, Stewart, Kolasch & Birch, LLP

(57) ABSTRACT

A negative electrode active material including: silicon-containing composite particles including $SiO_x$ (0<x<2) and pores; and a carbon layer on a surface of the silicon-containing composite particles and in the pores, in which the carbon layer includes a metal, the metal includes at least one selected from the group consisting of Li, Na and K, and the pores have an average diameter in a range of 2 nm to 45 nm, a negative electrode including the same, a secondary battery including the negative electrode and a method for preparing the negative electrode active material.

13 Claims, 1 Drawing Sheet forming silicon-containing composite particles including pores from preliminary silicon-containing composite particles by etching the preliminary silicon-containing composite particles disposing a polymer on a surface of the silicon-containing composite particles and in the pores forming preliminary particles performing a first heat treatment on the preliminary particles to form a carbon layer performing a second heat treatment on the preliminary particles having the carbon layer

(56) References Cited

U.S. PATENT DOCUMENTS

| | | |
|---|---|---|
| 2017/0194638 A1 | 7/2017 | Cho et al. |
| 2017/0271651 A1 | 9/2017 | Behan et al. |
| 2018/0269475 A1 | 9/2018 | Oh et al. |
| 2020/0014026 A1 | 1/2020 | Song et al. |
| 2020/0099052 A1 | 3/2020 | Choi et al. |
| 2020/0350571 A1 | 11/2020 | Lee et al. |
| 2020/0365882 A1 | 11/2020 | Park et al. |
| 2021/0111395 A1* | 4/2021 | Shin ............ H01M 4/483 |
| 2021/0151742 A1 | 5/2021 | Kim et al. |
| 2021/0167369 A1 | 6/2021 | Park et al. |
| 2021/0184204 A1 | 6/2021 | Oh |
| 2022/0271289 A1 | 8/2022 | Lee et al. |
| 2022/0325105 A1 | 10/2022 | Oh et al. |
| 2023/0268494 A1* | 8/2023 | Zhong ............ H01M 4/386 |
| | | 429/218.1 |

FOREIGN PATENT DOCUMENTS

| | | |
|---|---|---|
| KR | 10-2015-0141154 A | 12/2015 |
| KR | 10-2016-0070909 A | 6/2016 |
| KR | 10-2017-0006164 A | 1/2017 |
| KR | 10-2017-0078203 A | 7/2017 |
| KR | 10-2017-0090449 A | 8/2017 |
| KR | 10-2018-0132278 A | 12/2018 |
| KR | 10-2019-0030676 A | 3/2019 |
| KR | 10-2019-0060698 A | 6/2019 |
| KR | 10-2019-0091001 A | 8/2019 |
| KR | 10-2019-0104895 A | 9/2019 |
| KR | 10-2020-0023241 A | 3/2020 |
| KR | 10-2020-0052263 A | 5/2020 |
| KR | 10-2020-0061127 A | 6/2020 |
| KR | 10-2185490 B1 | 12/2020 |
| KR | 10-2021-0021932 A | 3/2021 |
| KR | 10-2021-0038364 A | 4/2021 |

* cited by examiner

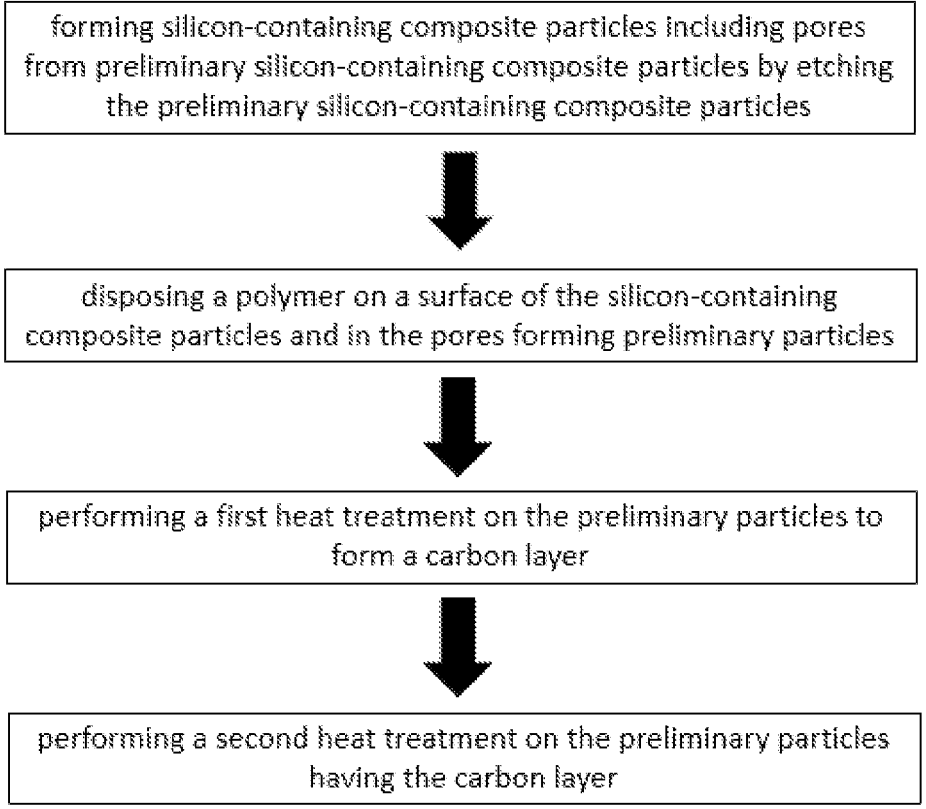

NEGATIVE ELECTRODE ACTIVE MATERIAL, NEGATIVE ELECTRODE INCLUDING NEGATIVE ELECTRODE ACTIVE MATERIAL, SECONDARY BATTERY INCLUDING NEGATIVE ELECTRODE, AND METHOD FOR PREPARING NEGATIVE ELECTRODE ACTIVE MATERIAL

CROSS-REFERENCE TO RELATED APPLICATIONS

This application claims priority to and the benefit of Korean Patent Application No. 10-2021-0107518 filed in the Korean Intellectual Property Office on Aug. 13, 2021 and Korean Patent Application No. 10-2022-0008538 filed in the Korean Intellectual Property Office on Jan. 20, 2022, the entire contents of which are incorporated herein by reference.

TECHNICAL FIELD

The present invention relates to a negative electrode active material, a negative electrode including the negative electrode active material, a secondary battery including the negative electrode, and a method for preparing the negative electrode active material.

BACKGROUND ART

Demands for the use of alternative energy or clean energy are increasing due to the rapid increase in the use of fossil fuels, and as a part of this trend, the most actively studied field is a field of electricity generation and electricity storage using an electrochemical reaction.

Currently, representative examples of an electrochemical device using such electrochemical energy include a secondary battery, and the usage areas thereof are increasing more and more. Recently, as the technological development and demand for portable devices such as portable computers, portable phones, and cameras have increased, the demand for secondary batteries as an energy source has increased sharply, and numerous studies have been conducted on a lithium secondary battery having a high energy density, that is, a high capacity among such secondary batteries, and the lithium secondary battery having a high capacity has been commercialized and widely used.

In general, a secondary battery includes a positive electrode, a negative electrode, an electrolyte, and a separator. The negative electrode includes a negative electrode active material for intercalating and de-intercalating lithium ions from the positive electrode, and as the negative electrode active material, a silicon-containing particle having high discharge capacity may be used. However, $SiO_2$ in silicon-containing particles such as $SiO_x$ ($0 \leq x < 2$) partially react with lithium ions delivered from the positive electrode to produce lithium silicates, and the lithium silicates irreversibly act, and thus are a cause of reducing the initial efficiency of the battery. Further, the volume of the silicon-containing particles changes significantly during the charging/discharging process, causing a side reaction with an electrolytic solution. Therefore, a problem occurs in that the service life of the battery is reduced.

In order to solve the problem in the related art, a technique of improving the initial efficiency by intentionally doping silicon-containing particles with a metal, such as Mg, to block a reaction site which may be irreversibly formed has been used. However, when the technique is applied, there is a disadvantage in that a discharging capacity per weight of a negative electrode active material is excessively reduced according to metal doping.

Thus, a technique of removing some of a metal compound by a doped metal has also been used. However, a side reaction between a negative electrode active material and an electrolytic solution occurs due to a plurality of large pores when the above technique is used, so that there is a problem in that the service life performance of a battery is reduced.

Meanwhile, a technique of forming a carbon layer has been used in order to improve the conductivity of the negative electrode active material. However, there is a problem in that it is difficult to uniformly dispose the carbon layer on and inside of the negative electrode active material using a general carbon layer preparation method, so that the degree of improvement in service life performance of a battery is not large.

Therefore, there is a need for a negative electrode active material having pores with a small size and a carbon layer uniformly dispersed, and a method for preparing the negative electrode active material.

RELATED ART DOCUMENT

Patent Document (Patent Document 1) Korean Patent Application Laid-Open No. 10-2019-0030676

SUMMARY OF THE INVENTION

The present invention has been made in an effort to provide a negative electrode active material in which there may be few side reactions with an electrolytic solution, the volume change during the charging and discharging of a battery may be suppressed, and the conductivity may be improved.

The present invention has also been made in an effort to provide a negative electrode including the negative electrode active material.

The present invention has also been made in an effort to provide a secondary battery including the negative electrode and having at least one of improved discharge capacity, initial efficiency and service life characteristics.

The present invention has also been made in an effort to provide a method for preparing the negative electrode active material.

An exemplary embodiment of the present invention provides a negative electrode active material including: silicon-containing composite particles including $SiO_x$ ($0 < x < 2$), and pores; and a carbon layer on the surface of the silicon-containing composite particle and in the pores, in which the carbon layer includes carbon and a metal, the metal includes at least one selected from the group consisting of Li, Na and K, and the average diameter of the pores is in the range of 2 nm to 45 nm.

Another exemplary embodiment provides a negative electrode including the negative electrode active material.

Yet another exemplary embodiment provides a secondary battery including the negative electrode.

Still another exemplary embodiment provides a method for preparing the above-described negative electrode active material, the method including: forming silicon-containing composite particles including pores from preliminary silicon-containing composite particles including $SiO_x$ ($0 < x < 2$); forming preliminary particles by disposing a polymer on a surface of the silicon-containing composite particles and in the pores; forming a carbon layer by subjecting the preliminary particles to a first heat treatment; and subjecting the preliminary particles in which the carbon layer is formed to a second heat treatment, in which the polymer includes carbon and at least one metal selected from the group consisting of Li, Na and K.

Since the negative electrode active material of the present invention has a small number of pores and pores having a small size, the number of side reactions between an electrolytic solution and the negative electrode active material is reduced when a battery is driven, so that the service life characteristics of the battery can be improved.

Since the negative electrode active material includes a metal compound phase and silicon-containing composite particles from which $SiO_2$ is at least partially removed, the discharge capacity and initial efficiency of the battery can be improved.

Since a carbon layer is formed by disposing a polymer on the surface of the silicon-containing composite particles and inside of the pores and heat-treating the polymer, the volume change of the negative electrode active material can be readily suppressed during the charging/discharging process of the battery, so that the service life characteristics of the battery can be improved.

In the process of preparing the negative electrode active material, since the pore size (average diameter) of the silicon-containing composite particles is at a low level before a carbon layer is formed, the size of the pores can be easily controlled (the size of pores is decreased and the number of pores is reduced) by a heat treatment.

In the process of preparing the negative electrode active material, since the polymer includes at least one metal selected from the group consisting of Li, Na and K, the carbon layer can be uniformly disposed on the surface of the silicon-containing composite particles and inside of the pores, and the conductivity of the prepared carbon layer is improved, so that the service life characteristics of the battery can be improved.

BRIEF DESCRIPTION OF THE DRAWINGS

The present invention will become more fully understood from the detailed description given below and the accompanying drawings that are given by way of illustration only and thus do not limit the present invention.

The FIGURE is a flowchart showing the method for preparing the negative electrode active material.

DETAILED DESCRIPTION

Hereinafter, the present invention will be described in more detail in order to help the understanding of the present invention.

The terms or words used in the present specification and the claims should not be construed as being limited to typical or dictionary meanings, and should be construed as meanings and concepts conforming to the technical spirit of the present invention on the basis of the principle that an inventor can appropriately define concepts of the terms in order to describe his or her own invention in the best way.

The terms used in the present specification are used only to describe specific embodiments, and are not intended to limit the present invention. Singular expressions include plural expressions unless the context clearly indicates otherwise.

In the present invention, the term "comprise", "include", or "have" is intended to indicate the presence of the characteristic, number, step, operation, constituent element, or any combination thereof implemented, and should be understood to mean that the presence or addition possibility of one or more other characteristics or numbers, steps, operations, constituent elements, or any combination thereof is not precluded.

In the present specification, the size of pores may mean an average value of diameters of pores included in a negative electrode active material. Thus, the size may represent the average diameter of pores.

In the present specification, the crystallinity of a structure included in a negative electrode active material may be confirmed by X-ray diffraction analysis, the X-ray diffraction analysis may be performed using an X-ray diffraction (XRD) analyzer (tradename: D4-endavor, manufacturer: Bruker), and in addition to the apparatus, any apparatus used in the art may be appropriately employed. In an example, the coating layer may be amorphous when no crystalline peaks derived from a specific coating layer appear during X-ray diffraction analysis of the negative electrode active material. Specifically, in the case of XRD, crystalline peaks are detected, and it can be confirmed that when there is no difference in XRD graph of the negative electrode active material before and after the coating of a specific coating layer, the crystalline peak derived from the coating layer does not appear and the coating layer is an amorphous coating layer.

In the present specification, an average particle size ($D_{50}$) may be defined as a particle size corresponding to 50% of a cumulative volume in a particle size distribution curve of the particles. The average particle diameter ($D_{50}$) may be measured using, for example, a laser diffraction method. The laser diffraction method can generally measure a particle size of about several mm from the submicron region, and results with high reproducibility and high resolution may be obtained.

In the present invention, the specific surface area of a silicon-containing composite may be measured by a Brunauer-Emmett-Teller (BET) method. For example, the specific surface area of the silicon-containing composite may be measured by a BET six-point method by a nitrogen gas adsorption distribution method using a porosimetry analyzer (Bell Japan Inc, Belsorp-II mini).

In the present invention, the size of pores (average diameter of pores) may be measured by an equation according to a Barrett-Joyer-Halenda (BJH) method by a nitrogen adsorption method. Specifically, a pore area according to the size of pores was derived using a BELSORP-mini II model manufactured by BEL Japan, Inc., and then the size of pores showing the largest pore area was employed as a representative pore size. The BJH method may be used, and in the plot of the measured values, the X-axis is the diameter (Dp/nm) of the pores, and the Y-axis is dVp/dDp ($cm^3$ $g^{-1}$ $nm^{-1}$)

<Negative Electrode Active Material>

The negative electrode active material according to an exemplary embodiment of the present invention includes: silicon-containing composite particles including $SiO_x$ (0<x<2), and pores; and a carbon layer on a surface of the silicon-containing composite particles and in the pores, in which the carbon layer includes carbon and a metal, the metal includes at least one selected from the group consisting of Li, Na and K, and the pores may have an average diameter in a range of 2 nm to 45 nm.

In the present specification, the fact that the carbon layer is disposed on the surface of the silicon-containing composite particles means that the carbon layer is disposed on the external surface, except for the pores of the silicon-containing composite particle.

In the present specification, the fact that the carbon layer is disposed in the pores of the silicon-containing composite particle means that the carbon layer is disposed on the surface and/or in the internal space of the pores included in the silicon-containing composite particle.

The negative electrode active material according to an exemplary embodiment of the present invention includes silicon-containing composite particles. The silicon-containing composite particles include $SiO_x$ (0<x<2) and pores.

The $SiO_x$ (0<x<2) corresponds to a matrix in the silicon-containing composite particle. The $SiO_x$ (0<x<2) may be in a form including Si and $SiO_2$, and the Si may also form a phase. That is, the x corresponds to the number ratio of O for Si included in the $SiO_x$ (0<x<2). When the silicon-containing composite particles include the $SiO_x$ (0<x<2), the discharge capacity of a secondary battery may be improved.

In an exemplary embodiment of the present invention, the pores may have a size of 2 nm to 45 nm, specifically 2 nm to 40 nm, and more specifically 2 nm to 35 nm.

In another exemplary embodiment, the pores may have a size of 2 nm to 30 nm, 2 nm to 25 nm, 2 nm to 20 nm, or 2 nm to 18 nm.

In an exemplary embodiment of the present invention, the lower limit of the size of the pores may be 2 nm, 3 nm, 4 nm, 5 nm, 6 nm, or 7 nm, and the upper limit of the size of the pores may be 45 nm, 40 nm, 35 nm, 30 nm, 25 nm, 20 nm, 18 nm, 16 nm, 15 nm, 14 nm, 13 nm, 12 nm, 11 nm, 10 nm, 9 nm, or 8 nm.

When the pores have a size less than 2 nm, the degree of the volume change of the battery may become severe because it is difficult for the pores to accommodate an excessive change in the volume of the silicon-containing composite particles, and accordingly, the service life characteristics of the battery may deteriorate. When the pores have a size more than 45 nm, the side reactions between an electrolytic solution and the silicon-containing composite particles may be increased, so that the service life characteristics of the battery may deteriorate. The size of pores is particularly controlled by a process such as the synthesis, etching, and additional heat treatment of silicon-containing composite particles, and corresponds to a lower value than the pore size of silicon-containing composite particles in the related art.

In an exemplary embodiment of the present invention, the silicon-containing composite particles may include one or more of a Mg element and a Li element.

In an exemplary embodiment of the present invention, the silicon-containing composite particles may include a Mg element.

In an exemplary embodiment of the present invention, the silicon-containing composite particles may include a Li element.

The Mg element or Li element is in a form in which the silicon-containing composite particles are doped with the element, and may be distributed on the surface and/or inside of the silicon-containing composite particle. The metal atoms are distributed on the surface and/or inside of the silicon-containing composite particle, and thus may control the volume expansion/contraction of the silicon-containing composite particles to an appropriate level, and may serve to prevent damage to the active material. Further, the metal atom may be contained from the aspect of reducing the ratio of the irreversible phase (for example, $SiO_2$) in the $SiO_x$ (0<x<2) particles to increase the efficiency of the active material.

The Mg element or Li element may be present as a Mg compound phase or a Li compound phase in the silicon-containing composite particles, respectively. The Mg compound or Li compound may correspond to a matrix in the silicon-containing composite particle.

The Mg compound phase or Li compound phase may be present inside and/or on the surface of the $SiO_x$ (0<x<2). The initial efficiency of the battery may be improved by the Mg compound phase or Li compound phase.

The Mg compound may include at least one selected from the group consisting of Mg silicates, Mg silicides and Mg oxides. The Mg silicate may include at least one of $Mg_2SiO_4$ and $MgSiO_3$. The Mg silicide may include $Mg_2Si$. The Mg oxide may include MgO.

The Li compound may include at least one selected from the group consisting of Li silicates, Li silicides and Li oxides. The Li silicate may include at least one of $Li_2SiO_3$, $Li_4SiO_4$ and $Li_2Si_2O_5$. The Li silicide may include $Li_7Si_2$. The Li oxide may include $Li_2O$.

In an exemplary embodiment of the present invention, the Li compound may be present in the form of a lithium silicate. The lithium silicate is represented by $Li_aSi_bO_c$ (2≤a≤4, 0<b≤2, 2≤c≤5) and may be classified into crystalline lithium silicate and amorphous lithium silicate. The crystalline lithium silicate may be present in the form of at least one lithium silicate selected from the group consisting of $Li_2SiO_3$, $Li_4SiO_4$ and $Li_2Si_2O_5$ in the silicon-containing composite particles, and the amorphous lithium silicate may be in the form of $Li_aSi_bO_c$ (2≤a≤4, 0<b≤2, 2≤c≤5), and are not limited to the forms.

One or more of the Mg element and the Li element may be included in an amount of 0.01 wt % to 20 wt %, specifically 0.1 wt % to 10 wt %, and more specifically 0.5 wt % to 8 wt % based on a total 100 wt % of the negative electrode active material. When the above range of 0.01 wt % to 20 wt % is satisfied, the Mg compound or Li compound phase may be included in an appropriate content in the negative electrode active material, so that the volume change of the negative electrode active material during the charging and discharging of a battery may be readily suppressed, and the discharge capacity and initial efficiency of the battery may be improved.

The content of the Mg element or Li element may be confirmed by Inductive Couple Plasma (ICP) analysis. For the ICP analysis, after a predetermined amount (about 0.01 g) of the negative electrode active material is exactly aliquoted, the negative electrode active material is completely decomposed on a hot plate by transferring the aliquot to a platinum crucible and adding nitric acid, hydrofluoric acid, or sulfuric acid thereto. Thereafter, a reference calibration curve is prepared by measuring the intensity of a standard liquid prepared using a standard solution (5 mg/kg) in an intrinsic wavelength of the Mg element or Li element using an inductively coupled plasma atomic emission spectrometer (ICPAES, Perkin-Elmer 7300). Thereafter, a pre-treated sample solution and a blank sample are each introduced into the apparatus, an actual intensity is calculated by measuring each intensity, the concentration of each component relative to the prepared calibration curve is calculated, and then the contents of the Mg element or the Li element of the prepared negative electrode active material may be analyzed by converting the total sum so as to be the theoretical value.

In an exemplary embodiment of the present invention, the silicon-containing composite particles include a Mg element, and pores of the silicon-containing composite particles may have a size of 2 nm to 40 nm. Alternatively, the pores may have a size of 2 nm to 35 nm, 2 nm to 20 nm, 5 nm to 15 nm, or 5 nm to 10 nm.

In an exemplary embodiment of the present invention, the silicon-containing composite particles include a Li element, and pores of the silicon-containing composite particles may have a size of 2 nm to 40 nm. Alternatively, the pores may have a size of 2 nm to 35 nm, 2 nm to 15 nm, or 5 nm to 10 nm.

In an exemplary embodiment of the present invention, when the silicon-containing composite particles are not doped, the pores of the silicon-containing composite particles may have a size of 2 nm to 40 nm. Alternatively, the pores may have a size of 2 nm to 35 nm, 2 nm to 15 nm, 3 nm to 10 nm, or 3 nm to 5 nm.

In an exemplary embodiment of the present invention, the silicon-containing composite particles may have a BET specific surface area of 1 $m^2/g$ to 100 $m^2/g$, specifically 5 $m^2/g$ to 80 $m^2/g$, more specifically 10 $m^2/g$ to 70 $m^2/g$, and for example, 15 $m^2/g$ to 65 $m^2/g$. When the above range of 1 $m^2/g$ to 100 $m^2/g$ is satisfied, side reactions with an electrolytic solution during the charging and discharging of a battery may be reduced, so that the service life characteristics of the battery may be improved.

In an exemplary embodiment of the present invention, the carbon layer may be disposed on the surface of the silicon-containing composite particle and in the pore. Accordingly, conductivity may be imparted to the silicon-containing composite particles, and the volume change of a negative electrode active material including the silicon-containing composite particles may be effectively suppressed, so that the service life characteristics of the battery may be improved.

In this case, the carbon layer may be in the form of partially covering at least a part on the surface of the silicon-containing composite particles and in the pores, that is, the surface of the particle and the inside of the pores, or entirely covering the surface of the particles and the inside of the pores.

The carbon layer may include amorphous carbon. The amorphous carbon may suppress the expansion of the silicon-containing composite particles by appropriately maintaining the strength of the carbon layer.

The carbon layer may be included in an amount of 1 wt % to 50 wt %, specifically 5 wt % to 45 wt %, and more specifically 8 wt % to 40 wt % or 20 wt % to 35 wt %, based on a total 100 wt % of the negative electrode active material. When the above range of 1 wt % to 50 wt % is satisfied, the conductivity of the negative electrode active material may be improved, and the volume change of the negative electrode active material during the charging and discharging of a battery may be readily suppressed, so that the service life characteristics of the battery may be improved.

The carbon layer may have a thickness of 1 nm to 500 nm, and specifically 5 nm to 300 nm. When the above range of 1 nm to 500 nm is satisfied, the volume change of the negative electrode active material may be readily suppressed and side reactions between an electrolytic solution and the negative electrode active material may be suppressed, so that the service life characteristics of a battery may be improved.

In an exemplary embodiment of the present invention, the carbon layer may include a metal. The metal may include at least one selected from the group consisting of Li, Na and K, and the carbon layer may be uniformly disposed in the negative electrode active material by the metal.

In an exemplary embodiment of the present invention, the metal may be included in an amount of 0.1 wt % to 30 wt %, specifically 1 wt % to 25 wt %, and more specifically 1.5 wt % to 20 wt %, based on a total 100 wt % of the negative electrode active material.

In another exemplary embodiment, the metal may be included in an amount of 2 wt % to 10 wt %, or 2 wt % to 7 wt %, or 2.5 to 6.5 wt %, based on a total 100% of the negative electrode active material.

In still another exemplary embodiment, the lower limit of the content of the metal may be 0.1 wt %, 1 wt %, 1.5 wt %, 2 wt % or 2.5 wt %, based on a total 100% of the negative electrode active material and the upper limit thereof may be 30 wt %, 25 wt %, 20 wt %, 15 wt %, 10 wt %, 7 wt % or 6.5 wt %, based on a total 100% of the negative electrode active material.

When the above range of 0.1 wt % to 30 wt % is satisfied, the carbon layer may be uniformly disposed on the surface of the silicon-containing composite particles and inside of the pores. Accordingly, the conductivity of the negative electrode active material may be improved and the service life characteristics of the battery may be improved.

The negative electrode active material may have a BET specific surface area of 0.5 $m^2/g$ to 10 $m^2/g$ and 0.5 $m^2/g$ to 5 $m^2/g$, specifically 0.6 $m^2/g$ to 2.5 $m^2/g$, more specifically 0.8 $m^2/g$ to 2 $m^2/g$, and for example, 1 $m^2/g$ to 2 $m^2/g$. The lower limit of the BET specific surface area of the negative electrode active material may be 0.5 $m^2/g$, 0.6 $m^2/g$, 0.7 $m^2/g$, 0.8 $m^2/g$, 0.9 $m^2/g$ or 1 $m^2/g$, and the upper limit thereof may be 10 $m^2/g$, 8 $m^2/g$, 6 $m^2/g$, 5 $m^2/g$, 4 $m^2/g$, 3 $m^2/g$ or 2 $m^2/g$. When the above range of 0.5 $m^2/g$ to 10 $m^2/g$ is satisfied, the service life characteristics of a battery may be improved because a side reaction between an electrolytic solution and the negative electrode active material during charging and discharging of the battery may be reduced.

The BET specific surface area generally corresponds to a value lower than the BET specific surface area of metal-doped silicon-containing particles including a carbon layer. In the case of common particles in the related art, a carbon layer is formed by polymer coating and carbonization for silicon-containing composite particles whose pore size is not controlled, but in the case of silicon-containing composite particles whose pore size is not controlled, the size of the pores is not easily decreased even when heat is applied. Therefore, in the case of common particles in the related art, the BET surface area thereof has to be large. In contrast, in the present invention, since the silicon-containing composite particles whose pore size is controlled to a low level are used and an additional heat treatment after a carbon layer is formed is performed, the size and number of pores may be effectively controlled, so that a low specific surface area of 0.5 $m^2/g$ to 5 $m^2/g$ may be derived.

The negative electrode active material may have an average particle diameter ($D_{50}$) of 1 μm to 30 μm, specifically 3 μm to 20 μm, and more specifically 5 μm to 10 μm. When the above range of 1 μm to 30 μm is satisfied, side reactions between the negative electrode active material and an electrolytic solution may be controlled, and the discharge capacity and initial efficiency of the battery may be effectively implemented.

<Preparation Method of Negative Electrode Active Material>

As illustrated in the FIGURE, an exemplary embodiment of the present invention provides a method for preparing a negative electrode active material, the method including: forming silicon-containing composite particles including pores from preliminary silicon-containing composite particles including $SiO_x$ (0<x<2); forming preliminary particles by disposing a polymer on a surface of the silicon-containing composite particles and in the pores; forming a carbon layer by subjecting the preliminary particles to a first heat treatment; and subjecting the preliminary particles in which the carbon layer is formed to a second heat treatment, in which the polymer includes carbon and at least one metal selected from the group consisting of Li, Na and K.

The negative electrode active material may be the same as the negative electrode active material of the above-described exemplary embodiments.

In an exemplary embodiment of the present invention, the preliminary silicon-containing composite particles may be silicon-containing oxide particles including $SiO_x$ (0<x<2).

In an exemplary embodiment of the present invention, the preliminary silicon-containing composite particles may be silicon-containing oxide particles formed by heat-treating a powder in which a Si powder and a $SiO_2$ powder are mixed.

The mixed powder of Si powder and $SiO_2$ powder may be vaporized by performing heat treatment at 1000° C. to 1800° C. or 1200° C. to 1500° C.

The silicon-containing oxide particles may further include one or more of a Mg element and a Li element, and the Mg element or the Li element may be distributed on the surface of and/or inside the silicon-containing oxide particles while the silicon-containing oxide particles are doped with the Mg element or the Li element.

In another exemplary embodiment, the preliminary silicon-containing composite particles may be formed through forming a mixed gas by vaporizing a powder in which a Si powder and a $SiO_2$ powder are mixed and Li or Mg, respectively, and then mixing the vaporized powder and Li or Mg, and heat-treating the mixed gas in a vacuum state at 800° C. to 950° C. Further, an additional heat treatment may be performed after the above heat treatment, and the additional heat treatment may be performed at 800° C. to 1,000° C.

The mixed powder of the Si powder and the $SiO_2$ powder may be vaporized by performing the heat treatment at 1,000° C. to 1,800° C. or 1,200° C. to 1,500° C., and the Mg powder may be vaporized by performing the heat treatment at 500° C. to 1,200° C. or 600° C. to 800° C.

Since the heat-treating of the mixed gas may be performed at a predetermined temperature, and accordingly, the Mg compound may be formed in a small size, pores may be formed in a small size in the silicon-containing composite particles during a subsequent etching.

In the preliminary silicon-containing composite particles, the Mg compound phase may include the above-described Mg silicates, Mg silicides, Mg oxides, and the like.

In still another exemplary embodiment, the preliminary silicon-containing composite particles may be formed through forming silicon-containing oxide particles; and distributing a Li compound in the formed silicon-containing oxide particles.

The silicon-containing oxide particles may be formed by heat-treating a powder in which a Si powder and a $SiO_2$ powder are mixed. Specifically, after the mixed powder of the Si powder and the $SiO_2$ powder is heated and vaporized under vacuum, depositing the vaporized mixed gas may be included.

The mixed powder of Si powder and $SiO_2$ powder may be vaporized by performing heat treatment at 1000° C. to 1800° C. or 1200° C. to 1500° C.

The preliminary silicon-containing composite particles may be silicon-containing oxide particles including $SiO_x$ (0<x<2).

The distributing of the Li compound in the formed silicon-containing oxide particles includes mixing the silicon-containing oxide particles and a Li precursor. If necessary, the above steps may be performed under heat treatment or by using an electrochemical method.

The Li precursor may be, for example, a Li powder, LiOH, $Li_2O$, and the like, and is not limited thereto. The silicon-containing oxide particles and the Li precursor are mixed, and a heat treatment may be performed at 400° C. to 1,400° C., if necessary.

A heat treatment step after the formed silicon-containing oxide and the Li precursor are mixed may be performed in an inert atmosphere.

The heat treatment step after the formed silicon-containing oxide and the Li precursor are mixed may be performed in an inert atmosphere at 400° C. to 1,400° C., 500° C. to 1,000° C. or 700° C. to 900° C. Further, an additional heat treatment may be performed after the above heat treatment, and the additional heat treatment may be performed at 700° C. to 1,000° C. or 800° C. to 1,000° C.

In the preliminary silicon-containing negative electrode active material, the Li compound phase may include the above-described Li silicates, Li silicides, Li oxides, and the like.

In an exemplary embodiment of the present invention, the method for preparing a negative electrode active material may include forming a surface layer on at least a part of the surface of the negative electrode active material. The surface layer may include at least one selected from the group consisting of aluminum phosphate and lithium phosphate. The surface layer may include aluminum phosphate and lithium phosphate.

The forming of the silicon-containing composite particles including pores from the preliminary silicon-containing composite particles may include etching the preliminary silicon-containing composite particles. In this case, the etching may be performed using an acid or a base, the acid may be at least one of hydrofluoric acid (HF), nitric acid ($HNO_3$), sulfuric acid ($H_2SO_4$) and hydrochloric acid (HCl), and the base may be at least one of sodium hydroxide (NaOH) and potassium hydroxide (KOH). Specifically, a mixed solution of hydrofluoric acid and ethanol may be used during the etching. Through the etching step, the discharge capacity and efficiency of a battery may be improved while the Mg compound phase and Li compound phase or $SiO_2$ of the preliminary silicon-containing composite particles are removed. The etching may be performed for 1 hour to 3 hours, specifically, 1 hour to 2.5 hours.

The pores may be formed in the preliminary silicon-containing composite particles through the etching step.

Therefore, the size of the pores formed in the preliminary silicon-containing particles may be more readily decreased after forming a carbon layer by subjecting the preliminary particles to a first heat treatment; and subjecting the preliminary particles in which the carbon layer is formed to a second heat treatment.

The forming of the preliminary particles may include a process of disposing a polymer on the surface of the silicon-containing composite particles and inside of the pores. The polymer may be disposed by together stirring a polymer solution including the polymer and the silicon-containing composite particles.

The polymer may include at least one selected from the group consisting of polyacrylic acid and polyvinyl alcohol, specifically, the polymer may include polyacrylic acid, and more specifically, the polymer may be polyacrylic acid. When polyacrylic acid is used, the polyacrylic acid is readily disposed on the surface and inside of the silicon-containing composite particles because the polyacrylic acid is easily dissolved in water, and hydrogen included in the polyacrylic acid may be easily substituted with at least one metal selected from the group consisting of Li, Na and K, so that a uniform carbon layer can be formed.

The polymer may include at least one selected from the group consisting of Li, Na and K. Accordingly, the carbon layer may be uniformly formed.

The polymer may include at least one selected from the group consisting of Li, Na and K in an amount of 0.1 wt % to 30 wt %, specifically 1 wt % to 20 wt %, and more specifically 3 wt % to 10 wt % or 5 wt % to 10 wt %, based on a total 100 wt % of the negative electrode active material. When the above range of 0.1 wt % to 30 wt % is satisfied, the conductivity of a prepared negative electrode active material may be effectively improved because the polymer may be uniformly disposed on the surface of the silicon-containing composite particles and inside of the pores.

The polymer may have a weight average molecular weight of 2,000 g/mol to 4,000,000 g/mol, specifically 100,000 g/mol to 1,250,000 g/mol, and more specifically 100,000 g/mol to 450,000 g/mol. In particular, when the polyacrylic acid has the above range of weight average molecular weight of 2,000 g/mol to 4,000,000 g/mol, a uniform carbon layer can be formed because the polyacrylic acid may be easily dissolved in water and the functional group of the polymer may be easily substituted with Li, Na and K.

In the forming of the carbon layer by subjecting the preliminary particles to the first heat treatment, the polymer is carbonized, so that a carbon layer including carbon and at least one selected from the group consisting of Li, Na and K may be formed.

The first heat treatment may be performed at 400° C. to 800° C., specifically 500° C. to 700° C., and more specifically 600° C. to 700° C. When the above range of 400° C. to 800° C. is satisfied, a carbon layer having an appropriate crystal structure may be readily formed on the surface of the negative electrode active material. The carbon layer may be an amorphous carbon layer.

A time for the first heat treatment may be 1 hour to 6 hours, and specifically 3 hours to 5 hours.

In the subjecting of the preliminary particles in which the carbon layer is formed to the second heat treatment, the size and number of pores of the silicon-containing composite particles may be reduced by the second heat treatment. Accordingly, side reactions between the negative electrode active material and an electrolytic solution may be reduced, so that the service life characteristics of a battery may be improved.

The second heat treatment may be performed at 900° C. to 1,100° C., and specifically 920° C. to 1,050° C. When the above range of 900° C. to 1,100° C. is satisfied, the size and number of pores of the silicon-containing composite particles may be effectively reduced. Accordingly, side reactions between the negative electrode active material and an electrolytic solution may be reduced, so that the service life characteristics of a battery may be improved.

A time for the second heat treatment may be 1 hour to 5 hours, and specifically 3 hours to 4 hours.

In an exemplary embodiment of the present invention, the pores may have a size of 2 nm to 45 nm, specifically 2 nm to 40 nm, and more specifically 2 nm to 35 nm.

In another exemplary embodiment, the pores may have a size of 2 nm to 30 nm, 2 nm to 25 nm, 2 nm to 20 nm, or 2 nm to 18 nm.

In an exemplary embodiment of the present invention, the lower limit of the pore size may be 2 nm, 3 nm, 4 nm, 5 nm, 6 nm, or 7 nm, and the upper limit thereof may be 45 nm, 40 nm, 35 nm, 30 nm, 25 nm, 20 nm, 18 nm, 16 nm, 15 nm, 14 nm, 13 nm, 12 nm, 11 nm, 10 nm, 9 nm, or 8 nm.

<Negative Electrode>

The negative electrode according to another exemplary embodiment of the present invention may include a negative electrode active material, and here, the negative electrode active material is the same as the negative electrode active material in the above-described exemplary embodiments. Specifically, the negative electrode may include a negative electrode current collector and a negative electrode active material layer disposed on one or both sides of the negative electrode current collector. The negative electrode active material layer may include the negative electrode active material. Furthermore, the negative electrode active material layer may further include a binder and/or a conductive material.

The negative electrode current collector is sufficient as long as the negative electrode current collector has conductivity without causing a chemical change to the battery, and is not particularly limited. For example, as the current collector, it is possible to use copper, stainless steel, aluminum, nickel, titanium, fired carbon, or a material in which the surface of aluminum or stainless steel is surface-treated with carbon, nickel, titanium, silver, and the like. Specifically, a transition metal, such as copper or nickel which adsorbs carbon well, may be used as a current collector. Although the current collector may have a thickness of 6 μm to 20 μm, the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also include various polymers thereof.

The conductive material is not particularly limited as long as the conductive material has conductivity without causing a chemical change to the battery, and for example, it is possible to use graphite such as natural graphite or artificial graphite; carbon black such as acetylene black, Ketjen black, channel black, furnace black, lamp black, and thermal black; a conductive fiber such as carbon fiber or metal fiber; a conductive tube such as a carbon nanotube; a carbon fluoride powder; a metal powder such as an aluminum powder, and a nickel powder; a conductive whisker such as zinc oxide and potassium titanate; a conductive metal oxide such as titanium oxide; a conductive material such as polyphenylene derivatives, and the like.

<Secondary Battery>

The secondary battery according to still another exemplary embodiment of the present invention may include the negative electrode in the above-described exemplary embodiment. Specifically, the secondary battery may include a negative electrode, a positive electrode, a separator interposed between the positive electrode and the negative electrode, and an electrolyte, and the negative electrode is the same as the above-described negative electrode.

The positive electrode may include a positive electrode current collector and a positive electrode active material layer formed on one or both sides of the positive electrode current collector and including the positive electrode active material.

In the positive electrode, the positive electrode current collector is not particularly limited as long as the positive electrode current collector has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector may typically have a thickness of 3 μm to 500 μm, and the adhesion of the positive electrode active material may also be enhanced by forming fine convex and concave irregularities on the surface of the current collector. For example, the positive electrode current collector may be used in various forms such as a film, a sheet, a foil, a net, a porous body, a foam, and a non-woven fabric body.

The positive electrode active material may be a typically used positive electrode active material. Specifically, the positive electrode active material includes: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as chemical formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c2}Mc_2O_2$ (here, M is at least one selected from the group consisting of Co, Mn, Al, Cu, Fe, Mg, B and Ga, and c2 satisfies $0.01 \leq c2 \leq 0.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c3 \leq 0.1$) or $Li_2Mn_3MO_8$ (here, M is at least any one selected from the group consisting of Fe, Co, Ni, Cu and Zn); $LiMn_2O_4$ in which Li of the chemical formula is partially substituted with an alkaline earth metal ion, and the like, but is not limited thereto. The positive electrode may be Li-metal.

The positive electrode active material layer may include a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof include graphite such as natural graphite or artificial graphite; a carbon-containing material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

The positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte solution as well as low resistance to ion movement in the electrolyte is preferable. Specifically, it is possible to use a porous polymer film, for example, a porous polymer film formed of a polyolefin-containing polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be selectively used as a single-layered or multi-layered structure.

Examples of the electrolyte include an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may include a non-aqueous organic solvent and a lithium salt.

As the non-aqueous organic solvent, it is possible to use, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

According to still another exemplary embodiment of the present invention, provided are a battery module including the secondary battery as a unit cell, and a battery pack including the same. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present invention, and it is natural that such alterations and modifications also fall within the accompanying claims.

Example 1

Example 1-1: Preparation of Negative Electrode Active Material (1) Formation of Preliminary Silicon-Containing Composite Particles A powder in which a Si powder and a $SiO_2$ powder were uniformly mixed at a molar ratio of 1:1 and Mg were heat-treated at 1,400° C. and 700° C., respectively, in a reduced pressure atmosphere to vaporize the Si powder, the $SiO_2$ powder, and the Mg. Particles were prepared by heat-treating a mixed gas in which the Si powder, the $SiO_2$ powder, and the Mg which had been vaporized were mixed in a chamber in a vacuum state at 800° C., and then performing an additional heat treatment at a temperature of 900° C. for 3 hours. The particles were pulverized with a jet mill to form preliminary silicon-containing composite particles having an average particle diameter ($D_{50}$) of about 5 μm.

(2) Formation of Silicon-Containing Composite Particles

A mixed solution of hydrofluoric acid and ethanol was used as an etching solution. After the preliminary silicon-containing composite particles were put into the etching solution at a weight ratio of 20:1 and mixed for about 1 hour and 30 minutes, the resulting mixture was filtered, washed and dried to form silicon-containing composite particles.

The prepared silicon-containing composite particles had a BET specific surface area of about 48 $m^2$/g.

(3) Formation of Preliminary Particles

The silicon-containing composite particles were immersed in a polymer solution including a polyacrylic acid including 8.8 wt % of Li and having a weight average molecular weight of 250,000 g/mol, and then sufficiently stirred using a stirrer. Thereafter, the polymer solution was filtered through a filtering process and dried to obtain preliminary particles. Through this process, the polyacrylic acid was disposed on the surface of the silicon-containing composite particles and in the pores.

(4) Preparation of Negative Electrode Active Material

A carbon layer including Li was prepared by subjecting the preliminary negative electrode active material to a first heat treatment at 600° C. under an Ar atmosphere for 3 hours. Thereafter, a negative electrode active material was prepared by performing an additional heat treatment (second heat treatment) on the preliminary negative electrode active material in which the carbon layer was formed at 950° C. for 3 hours to control the size and number of pores in the silicon-containing composite particles. The negative electrode active material had an average particle diameter ($D_{50}$) of 7 μm, and a BET specific surface area of about 1.3 $m^2$/g.

The content of a Mg element in the negative electrode active material was 0.9 wt %, and the carbon layer was included in an amount of 33.1 wt % in the negative electrode active material. The Li was included in an amount of 6.1 wt % in the negative electrode active material. Pores in the silicon-containing composite particles had a size (an average diameter) of 10 nm.

Example 1-2

A negative electrode active material was prepared in the same manner as in Example 1-1, except that etching was performed for 1 hour during the formation of the silicon-containing composite particles.

Example 1-3

A negative electrode active material was prepared in the same manner as in Example 1-1, except that the additional heat treatment (second heat treatment) was performed at 1,050° C. for 3 hours.

Example 1-4

A negative electrode active material was prepared in the same manner as in Example 1-1, except that a polymer solution including a polyacrylic acid including 3.7 wt % of Li and a weight average molecular weight of 250,000 g/mol was used during the formation of the preliminary particles.

Example 1-5

A negative electrode active material was prepared in the same manner as in Example 1-1, except that a polymer solution including a polyacrylic acid including 8.8 wt % of Li and a weight average molecular weight of 1,250,000 g/mol was used during the formation of the preliminary particles.

Example 1-6

A negative electrode active material was prepared in the same manner as in Example 1-1, except that a polymer solution including a polyacrylic acid including 8.8 wt % of Na and a weight average molecular weight of 250,000 g/mol was used during the formation of the preliminary particles.

Example 1-7

A negative electrode active material was prepared in the same manner as in Example 1-1, except that a polymer solution including a polyacrylic acid including 8.8 wt % of K and a weight average molecular weight of 250,000 g/mol was used during the formation of the preliminary particles.

Example 1-8

A negative electrode active material was prepared in the same manner as in Example 1-1, except that etching was performed for 2.5 hours during the formation of the silicon-containing composite particles.

Comparative Example 1-1

A negative electrode active material was prepared in the same manner as in Example 1-1, except that a polymer solution including a polyacrylic acid (weight average molecular weight 250,000 g/mol) which was not substituted with a metal was used during the formation of the preliminary particles.

Comparative Example 1-2

A negative electrode active material was prepared in the same manner as in Example 1-1, except that the etching was performed for 4 hours during the formation of the silicon-containing composite particles.

The content of the Mg element was confirmed by ICP analysis. Specifically, after a predetermined amount (about 0.01 g) of the negative electrode active material was aliquoted, the negative electrode active material was completely decomposed on a hot plate by transferring the aliquot to a platinum crucible and adding nitric acid, hydrofluoric acid, or sulfuric acid thereto. Thereafter, a reference calibration curve was prepared by measuring the intensity of a standard liquid prepared using a standard solution (5 mg/kg) in an intrinsic wavelength of the Mg element using an inductively coupled plasma atomic emission spectrometer (ICPAES, Perkin-Elmer 7300). Thereafter, a pre-treated sample solution and a blank sample were each introduced into the apparatus, an actual intensity was calculated by measuring each intensity, the concentration of each component relative to the prepared calibration curve was calculated, and then the content of the Mg element of the prepared negative electrode active material was analyzed by converting the total sum so as to be the theoretical value.

The content of the Li or the Na or the K was measured by ICP analysis. The metal content of the negative electrode active material was measured in the same manner as in the above-described Mg element content analysis method, except that the intrinsic wavelength of the Mg element was changed to the intrinsic wavelength of each metal.

The carbon layer content was measured by burning the sample together with a combustion improver in an oxygen stream using a CS analyzer.

TABLE 1

|  | BET specific surface are ($m^2$/g) of silicon-containing composite particles | Mg element content (wt %) in negative electrode active material | BET specific surface area ($m^2$/g) of negative electrode active material | Content (wt %) of carbon layer in negative electrode active material | Metal content (wt %) in negative electrode active material | Pore size (nm) |
|---|---|---|---|---|---|---|
| Example 1-1 | 48 | 0.9 | 1.3 | 33.0 | 6.1 (Li) | 10 |
| Example 1-2 | 32 | 1.5 | 1.1 | 30.2 | 5.8 (Li) | 7 |
| Example 1-3 | 48 | 0.9 | 0.9 | 33.0 | 6.1 (Li) | 9 |
| Example 1-4 | 48 | 0.9 | 1.3 | 33.5 | 2.5 (Li) | 12 |
| Example 1-5 | 48 | 0.9 | 3.9 | 27.8 | 5.5 (Li) | 14 |
| Example 1-6 | 48 | 0.9 | 2.15 | 28.3 | 5.4 (Na) | 12 |
| Example 1-7 | 48 | 0.9 | 2.37 | 28.5 | 5.6 (K) | 25 |
| Example 1-8 | 63 | 0.9 | 4.2 | 33.1 | 6.2 (Li) | 35 |
| Comparative Example 1-1 | 48 | 0.9 | 5.3 | 21.2 | 0 | 16 |
| Comparative Example 1-2 | 169 | 0.9 | 5.8 | 37.9 | 7.5 (Li) | 51 |

The specific surface areas of the silicon-containing composite and the negative electrode active material were measured by the Brunauer-Emmett-Teller (BET) method. Specifically, the specific surface areas were measured by a BET six-point method by a nitrogen gas adsorption distribution method using a porosimetry analyzer (Bell Japan Inc, Belsorp-II mini).

The size of the pores was measured by an equation according to a Barrett-Joyer-Halenda (BJH) method by a nitrogen adsorption method. Specifically, a pore area according to the size of pores was derived using a BELSORP-mini II model manufactured by BEL Japan, Inc., and then the size (Dp/nm) of pores showing the largest pore area (dVp/dDp) was measured.

Experimental Example 1: Evaluation of Discharge Capacity, Initial Efficiency, and Service Life (Capacity Retention Rate) Characteristics Negative electrodes and batteries were prepared using the negative electrode active materials in the Examples and the Comparative Examples, respectively.

A mixed negative electrode active material in which the negative electrode active material and natural graphite were mixed at a weight ratio of 1:9, carbon black as a conductive material, and carboxymethyl cellulose (CMC) and styrene butadiene rubber (SBR) as binders were mixed with water as a solvent at a weight ratio of the mixed negative electrode active material:the conductive material:the binder (CMC):

the binder (styrene butadiene)=95.4:1:1.1:2.5, thereby preparing a negative electrode slurry. After the negative electrode slurry was applied to a copper (Cu) metal thin film as a negative electrode current collector and dried, the metal thin film was punched, thereby preparing a negative electrode.

As a counter electrode, a Li metal was used. After a polyolefin separator was interposed between the negative electrode and Li metal, an electrolyte in which 1 M $LiPF_6$ was dissolved was injected into a solvent in which ethylene carbonate (EC) and diethyl carbonate (EMC) were mixed at a volume ratio of 3:7, thereby preparing a lithium coin-type half battery.

The discharge capacity, initial efficiency, capacity retention rate, and change rate in the electrode thickness were evaluated by charging and discharging the prepared battery, and are shown in the following Table 2.

For the 1st and 2nd cycles, the battery was charged and discharged at 0.1 C, and from the 3rd to 49th cycles, the battery was charged and discharged at 0.5 C. The 50th cycle was completed in a charged state (in a state in which lithium is contained in the negative electrode), the thickness was measured by disassembling the battery, and then the change rate in the electrode thickness was calculated.

Charging conditions: CC (constant current)/CV (constant voltage) (5 mV/0.005 C current cut-off) Discharging conditions: CC (constant current) conditions 1.5 V voltage cut-off The discharge capacity (mAh/g) and initial efficiency (%) were derived from the results during one-time charge/discharge. Specifically, the single discharge capacity and initial efficiency of the negative electrode active material of the present invention were calculated by inversely converting the charge/discharge capacity and initial efficiency in consideration of the fact that the single discharge capacity and initial efficiency of graphite are 365 mAh/g and 93%, respectively.

Discharge capacity (mAh/g) of negative electrode active material=(measured discharge capacity−(0.9×365))×10

Charge capacity (mAh/g) of negative electrode active material=(measured charge capacity−(0.9×365/0.93))×10

Initial efficiency (%)=(discharge capacity (mAh/g) of negative electrode active material/charge capacity (mAh/g) of negative electrode active material)×100

The charge retention rate and the change rate in the electrode thickness were derived by the following calculation, respectively.

Capacity retention rate (%)=(49 times discharge capacity/1 time discharge capacity)×100

Change rate (%) in thickness of electrode=((negative electrode thickness after charging 50 times−initial negative electrode thickness)/initial negative electrode thickness)×100

TABLE 2

| Battery | Discharge capacity (mAh/g) | Initial efficiency (%) | Capacity retention rate (%) | Change rate (%) in electrode thickness |
|---|---|---|---|---|
| Example 1-1 | 1630 | 84.1 | 85 | 48 |
| Example 1-2 | 1575 | 82.5 | 84 | 49 |
| Example 1-3 | 1625 | 83.8 | 81 | 51 |
| Example 1-4 | 1622 | 83.5 | 80 | 52 |
| Example 1-5 | 1620 | 83.2 | 79 | 54 |
| Example 1-6 | 1623 | 83.6 | 80 | 53 |
| Example 1-7 | 1609 | 83.1 | 79 | 55 |
| Example 1-8 | 1605 | 83.0 | 79 | 55 |
| Comparative Example 1-1 | 1565 | 80.5 | 75 | 60 |
| Comparative Example 1-2 | 1549 | 81.7 | 76 | 63 |

The negative electrode active material according to the present invention has a small number of pores and includes small pores in a range of 2 nm to 45 nm, so that side reactions between the electrolytic solution and the negative electrode active material are reduced when the battery is driven, and when the pores are formed, the discharge capacity and efficiency of the battery may be improved while the Mg compound phase and $SiO_2$ of the silicon-containing composite particles are removed. In addition, since the carbon layer includes a metal, the carbon layer is uniformly disposed on the surface of the silicon-containing composite particles and inside of the pores, so that the conductivity is improved. Therefore, it can be confirmed that Examples 1 to 6 in which the negative electrode active material according to the present invention is used have excellent discharge capacities, initial efficiencies, and capacity retention rates, and the change rates in the electrode thickness are also low.

In contrast, since the negative electrode active material used in Comparative Example 1-2 has large pores, side reactions between an electrolytic solution and the silicon-containing composite particles are increased, and the negative electrode active material used in Comparative Example 1-1 has a reduced conductivity because the carbon layer does not include a metal, and thus is not uniformly disposed, and accordingly, it can be confirmed that the discharge capacity, initial efficiency, and capacity retention rate are reduced, and the change rate in the electrode thickness is enhanced.

Example 2

Example 2-1: Preparation of Negative Electrode Active Material (1) Formation of Preliminary Silicon-Containing Composite Particles A powder in which a Si powder and a $SiO_2$ powder were uniformly mixed at a molar ratio of 1:1 was heat-treated at 1,400° C. in a reduced pressure atmosphere to recover a SiO powder. After the recovered SiO powder and a Li metal powder were heat-treated at a temperature of 800° C. in an inert atmosphere for 1 hour, particles were prepared by performing an additional heat treatment at a temperature of 900° C. for 3 hours. The particles were pulverized with a jet mill to form preliminary silicon-containing composite particles having an average particle diameter ($D_{50}$) of about 5 µm.

(2) Formation of Silicon-Containing Composite Particles

A mixed solution of hydrofluoric acid and ethanol was used as an etching solution. After the preliminary silicon-containing composite particles were put into the etching solution at a weight ratio of 20:1 and mixed for about 1 hour and 30 minutes, the resulting mixture was filtered, washed and dried to form silicon-containing composite particles.

The prepared silicon-containing composite particles had a BET specific surface area of about 45 m²/g.

(3) Formation of Preliminary Particles

The silicon-containing composite particles were immersed in a polymer solution including a polyacrylic acid including 8.8 wt % of Li and having a weight average molecular weight of 250,000 g/mol, and then sufficiently stirred using a stirrer. Thereafter, the polymer solution was filtered through a filtering process and dried to obtain preliminary particles. Through this process, the polyacrylic acid was disposed on the surface of the silicon-containing composite particle and in the pore.

(4) Preparation of Negative Electrode Active Material

A carbon layer including Li was prepared by subjecting the preliminary negative electrode active material to a first heat treatment at 600° C. under an Ar atmosphere for 3 hours. Thereafter, a negative electrode active material was prepared by performing an additional heat treatment (second heat treatment) on the preliminary negative electrode active material in which the carbon layer was formed at 950° C. for 3 hours to control the size and number of pores in the silicon-containing composite particles. The negative electrode active material had an average particle diameter ($D_{50}$) of 7 μm, and a BET specific surface area of about 1.2 m²/g.

The content of a Li element in the negative electrode active material was 6.6 wt %, and the carbon layer was included in an amount of 33.0 wt % in the negative electrode active material. Pores in the silicon-containing composite particles had a size of 8 nm.

Example 2-2

A negative electrode active material was prepared in the same manner as in Example 2-1, except that etching was performed for 1 hours during the formation of the silicon-containing composite particles.

Example 2-3

A negative electrode active material was prepared in the same manner as in Example 2-1, except that the additional heat treatment (second heat treatment) was performed at 1,050° C. for 3 hours.

Example 2-4

A negative electrode active material was prepared in the same manner as in Example 2-1, except that a polymer solution including a polyacrylic acid including 3.7 wt % of Li and a weight average molecular weight of 250,000 g/mol was used during the formation of the preliminary particles.

Example 2-5

A negative electrode active material was prepared in the same manner as in Example 2-1, except that a polymer solution including a polyacrylic acid including 8.8 wt % of Li and a weight average molecular weight of 1,250,000 g/mol was used during the formation of the preliminary particles.

Example 2-6

A negative electrode active material was prepared in the same manner as in Example 2-1, except that a polymer solution including a polyacrylic acid including 8.8 wt % of Na and a weight average molecular weight of 250,000 g/mol was used during the formation of the preliminary particles.

Example 2-7

A negative electrode active material was prepared in the same manner as in Example 2-1, except that a polymer solution including a polyacrylic acid including 8.8 wt % of K and a weight average molecular weight of 250,000 g/mol was used during the formation of the preliminary particles.

Example 2-8

A negative electrode active material was prepared in the same manner as in Example 2-1, except that etching was performed for 2.5 hours during the formation of the silicon-containing composite particles.

Comparative Example 2-1

A negative electrode active material was prepared in the same manner as in Example 2-1, except that a polymer solution including a polyacrylic acid (weight average molecular weight 250,000 g/mol) which was not substituted with a metal was used during the formation of the preliminary particles.

Comparative Example 2-2

A negative electrode active material was prepared in the same manner as in Example 2-1, except that the etching was performed for 4 hours during the formation of the silicon-containing composite particles.

TABLE 3

| | BET specific surface are (m²/g) of silicon-containing composite particles | Li content (wt %) in negative electrode active material | BET specific surface area (m²/g) of negative electrode active material | Content (wt %) of carbon layer in negative electrode active material | Metal in carbon layer | Pore size (nm) |
|---|---|---|---|---|---|---|
| Example 2-1 | 45 | 6.6 | 1.2 | 33.0 | Li | 8 |
| Example 2-2 | 30 | 6.3 | 1.0 | 29.9 | Li | 6 |
| Example 2-3 | 45 | 6.6 | 0.7 | 33.0 | Li | 7 |
| Example 2-4 | 45 | 2.8 | 1.2 | 33.2 | Li | 10 |
| Example 2-5 | 45 | 6.0 | 3.7 | 27.9 | Li | 12 |
| Example 2-6 | 45 | 0.4 | 1.9 | 28.4 | Na | 10 |
| Example 2-7 | 45 | 0.5 | 2.2 | 28.2 | K | 22 |
| Example 2-8 | 59 | 6.4 | 3.9 | 33.0 | Li | 32 |

TABLE 3-continued

| | BET specific surface are (m²/g) of silicon-containing composite particles | Li content (wt %) in negative electrode active material | BET specific surface area (m²/g) of negative electrode active material | Content (wt %) of carbon layer in negative electrode active material | Metal in carbon layer | Pore size (nm) |
|---|---|---|---|---|---|---|
| Comparative Example 2-1 | 45 | 0.8 | 5.1 | 21.3 | — | 14 |
| Comparative Example 2-2 | 151 | 7.9 | 5.6 | 37.4 | Li | 50 |

Experimental Example 2: Evaluation of Discharge Capacity, Initial Efficiency, and Service Life (Capacity Retention Rate) Characteristics Negative electrodes and batteries were prepared in the same manner as in Experimental Example 1 using the negative electrode active materials in the Examples and the Comparative Examples, respectively.

The discharge capacity, initial efficiency, capacity retention rate, and change rate in the electrode thickness were evaluated in the same manner as in Experimental Example 1 by charging and discharging the prepared battery, and are shown in the following Table 4.

TABLE 4

| Battery | Discharge capacity (mAh/g) | Initial efficiency (%) | Capacity retention rate (%) | Change rate (%) in electrode thickness |
|---|---|---|---|---|
| Example 2-1 | 1645 | 84.5 | 84 | 50 |
| Example 2-2 | 1601 | 83.0 | 83 | 50 |
| Example 2-3 | 1630 | 84.0 | 80 | 52 |
| Example 2-4 | 1628 | 84.1 | 79 | 53 |
| Example 2-5 | 1629 | 83.5 | 78 | 55 |
| Example 2-6 | 1641 | 83.9 | 79 | 54 |
| Example 2-7 | 1621 | 83.7 | 78 | 56 |
| Example 2-8 | 1619 | 83.5 | 78 | 56 |
| Comparative Example 2-1 | 1569 | 80.9 | 76 | 61 |
| Comparative Example 2-2 | 1554 | 81.9 | 73 | 64 |

The negative electrode active material according to the present invention has a small number of pores and includes small pores in a range of 2 nm to 45 nm, so that side reactions between the electrolytic solution and the negative electrode active material are reduced when the battery is driven, and when the pores are formed, the discharge capacity and efficiency of the battery may be improved while the Li compound phase and $SiO_2$ of the silicon-containing composite particles are removed. In addition, since a carbon layer includes a metal, the carbon layer is uniformly disposed on the surface of the silicon-containing composite particles and inside of the pores, so that the conductivity is improved. Therefore, it can be confirmed that Examples 2-1 to 2-8 in which the negative electrode active material according to the present invention is used have excellent discharge capacities, initial efficiencies, and capacity retention rates, and the change rates in the electrode thickness are also low.

In contrast, since the negative electrode active material used in Comparative Example 2-2 has large pores, side reactions between an electrolytic solution and the silicon-containing composite particles are increased, and the negative electrode active material used in Comparative Example 2-1 has a reduced conductivity because the carbon layer does not include a metal, and thus is not uniformly disposed, and accordingly, it can be confirmed that the discharge capacity, initial efficiency, and capacity retention rate are reduced, and the change rate in the electrode thickness is enhanced.

Example 3

Example 3-1: Preparation of Negative Electrode Active Material (1) Formation of Preliminary Silicon-Containing Composite Particles A powder in which a Si powder and a $SiO_2$ powder were uniformly mixed at a molar ratio of 1:1 was heat-treated at 1,400° C. in a reduced pressure atmosphere to recover a SiO powder. Particles were prepared by additionally heat-treating the recovered powder at a temperature of 900° C. for 3 hours. The particles were pulverized with a jet mill to form preliminary silicon-containing composite particles having an average particle diameter ($D_{50}$) of about 5 μm.

(2) Formation of Silicon-Containing Composite Particles

A mixed solution of hydrofluoric acid and ethanol was used as an etching solution. After the preliminary silicon-containing composite particles were put into the etching solution at a weight ratio of 20:1 and mixed for about 1 hour and 30 minutes, the resulting mixture was filtered, washed and dried to form silicon-containing composite particles.

The prepared silicon-containing composite particles had a BET specific surface area of about 30 m²/g.

(3) Formation of Preliminary Particles

The silicon-containing composite particles were immersed in a polymer solution including a polyacrylic acid including 8.8 wt % of Li and having a weight average molecular weight of 250,000 g/mol, and then sufficiently stirred using a stirrer. Thereafter, the polymer solution was filtered through a filtering process and dried to obtain preliminary particles. Through this process, the polyacrylic acid was disposed on the surface of the silicon-containing composite particle and in the pore.

(4) Preparation of Negative Electrode Active Material

A carbon layer including Li was prepared by subjecting the preliminary negative electrode active material to a first heat treatment at 600° C. under an Ar atmosphere for 3 hours. Thereafter, a negative electrode active material was prepared by performing an additional heat treatment (second heat treatment) on the preliminary negative electrode active material in which the carbon layer was formed at 950° C. for 3 hours to control the size and number of pores in the silicon-containing composite particles. The negative electrode active material had an average particle diameter ($D_{50}$) of 7 μm, and a BET specific surface area of about 1.0 m²/g.

The content of a Li element in the negative electrode active material was 6.4 wt %, and the carbon layer was included in an amount of 33.0 wt % in the negative electrode active material. Pores in the silicon-containing composite particles had a size of 5 nm.

Example 3-2

A negative electrode active material was prepared in the same manner as in Example 3-1, except that etching was performed for 1 hours during the formation of the silicon-containing composite particles.

Example 3-3

A negative electrode active material was prepared in the same manner as in Example 3-1, except that the additional heat treatment (second heat treatment) was performed at 1,050° C. for 3 hours.

Example 3-4

A negative electrode active material was prepared in the same manner as in Example 3-1, except that a polymer solution including a polyacrylic acid including 3.7 wt % of Li and a weight average molecular weight of 250,000 g/mol was used during the formation of the preliminary particles.

Example 3-5

A negative electrode active material was prepared in the same manner as in Example 3-1, except that a polymer solution including a polyacrylic acid including 8.8 wt % of Li and a weight average molecular weight of 1,250,000 g/mol was used during the formation of the preliminary particles.

Example 3-6

A negative electrode active material was prepared in the same manner as in Example 3-1, except that a polymer solution including a polyacrylic acid including 8.8 wt % of Na and a weight average molecular weight of 250,000 g/mol was used during the formation of the preliminary particles.

Example 3-7

A negative electrode active material was prepared in the same manner as in Example 3-1, except that a polymer solution including a polyacrylic acid including 8.8 wt % of K and a weight average molecular weight of 250,000 g/mol was used during the formation of the preliminary particles.

Example 3-8

A negative electrode active material was prepared in the same manner as in Example 3-1, except that etching was performed for 2.5 hours during the formation of the silicon-containing composite particles.

Comparative Example 3-1

A negative electrode active material was prepared in the same manner as in Example 3-1, except that a polymer solution including a polyacrylic acid (weight average molecular weight 250,000 g/mol) which was not substituted with a metal was used during the formation of the preliminary particles.

Comparative Example 3-2

A negative electrode active material was prepared in the same manner as in Example 3-1, except that the etching was performed for 4 hours during the formation of the silicon-containing composite particles.

TABLE 5

| | BET specific surface are (m²/g) of silicon-containing composite particles | BET specific surface area (m²/g) of negative electrode active material | Content (wt %) of carbon layer in negative electrode active material | Metal content (wt %) in negative electrode active material | Pore size (nm) |
|---|---|---|---|---|---|
| Example 3-1 | 30 | 1.0 | 33.0 | 6.4 (Li) | 5 |
| Example 3-2 | 20 | 0.9 | 29.8 | 6.2 (Li) | 3 |
| Example 3-3 | 30 | 0.5 | 33.0 | 6.4 (Li) | 4 |
| Example 3-4 | 30 | 1.0 | 33.2 | 2.7 (Li) | 8 |
| Example 3-5 | 30 | 3.5 | 27.9 | 5.8 (Li) | 10 |
| Example 3-6 | 30 | 1.7 | 28.4 | 6.1 (Li) | 8 |
| Example 3-7 | 30 | 2.0 | 28.1 | 5.5 (Na) | 20 |
| Example 3-8 | 51 | 3.4 | 33.0 | 6.1 (K) | 29 |
| Comparative Example 3-1 | 30 | 4.4 | 21.1 | — | 12 |
| Comparative Example 3-2 | 120 | 5.3 | 37.3 | 7.2 | 48 |

Experimental Example 3: Evaluation of Discharge Capacity, Initial Efficiency, and Service Life (Capacity Retention Rate) Characteristics Negative electrodes and batteries were prepared in the same manner as in Experimental Example 1 using the negative electrode active materials in the Examples and the Comparative Examples, respectively.

The discharge capacity, initial efficiency, capacity retention rate, and change rate in the electrode thickness were evaluated in the same manner as in Experimental Example 1 by charging and discharging the prepared battery, and are shown in the following Table 6.

TABLE 6

| Battery | Discharge capacity (mAh/g) | Initial efficiency (%) | Capacity retention rate (%) | Change rate (%) in electrode thickness |
|---|---|---|---|---|
| Example 3-1 | 1730 | 80.0 | 83 | 52 |
| Example 3-2 | 1670 | 78.5 | 82 | 52 |
| Example 3-3 | 1723 | 79.8 | 79 | 53 |
| Example 3-4 | 1725 | 79.5 | 78 | 54 |
| Example 3-5 | 1723 | 79.2 | 77 | 56 |
| Example 3-6 | 1725 | 79.6 | 78 | 56 |
| Example 3-7 | 1709 | 79.1 | 77 | 57 |
| Example 3-8 | 1705 | 79.0 | 77 | 57 |
| Comparative Example 3-1 | 1661 | 76.5 | 75 | 63 |
| Comparative Example 3-2 | 1649 | 77.1 | 74 | 65 |

The negative electrode active material according to the present invention has a small number of pores and includes small pores in a range of 2 nm to 45 nm, so that side reactions between the electrolytic solution and the negative electrode active material are reduced when the battery is driven, and when the pores are formed, the discharge capacity and efficiency of the battery may be improved while the irreversible $SiO_2$ of the silicon-containing composite particles are removed. In addition, since a carbon layer includes a metal, the carbon layer is uniformly disposed on the surface of the silicon-containing composite particles and inside of the pores, so that the conductivity is improved. Therefore, it can be confirmed that Examples 3-1 to 3-8 in which the negative electrode active material according to the present invention is used have excellent discharge capacities, initial efficiencies, and capacity retention rates, and the change rates in the electrode thickness are also low.

In contrast, since the negative electrode active material used in Comparative Example 3-2 has large pores, side reactions between an electrolytic solution and the silicon-containing composite particles are increased, and the negative electrode active material used in Comparative Example 3-1 has a reduced conductivity because the carbon layer does not include a metal, and thus is not uniformly disposed, and accordingly, it can be confirmed that the discharge capacity, initial efficiency, and capacity retention rate are reduced, and the change rate in the electrode thickness is enhanced.

What is claimed is:

1. A negative electrode active material comprising:
   silicon-containing composite particles comprising $SiO_x$, wherein 0<x<2, and pores within said particles; and
   a carbon layer on a surface of the silicon-containing composite particles and in the pores,
   wherein the carbon layer comprises carbon and a metal, the metal comprises at least one selected from the group consisting of Li, Na and K, and
   an average diameter of the pores is in a range of 2 nm to 45 nm.

2. The negative electrode active material of claim 1, wherein the silicon-containing composite particles further comprise one or more of a Mg element and a Li element.

3. The negative electrode active material of claim 2, wherein one or more of the Mg element and the Li element are present in an amount of 0.01 wt % to 20 wt % based on a total 100 wt % of the negative electrode active material.

4. The negative electrode active material of claim 1, wherein the metal of the carbon layer is present in an amount of 0.1 wt % to 30 wt % based on a total 100 wt % of the negative electrode active material.

5. The negative electrode active material of claim 1, wherein the negative electrode active material has an average particle diameter ($D_{50}$) of 1 μm to 30 μm.

6. The negative electrode active material of claim 1, wherein the negative electrode active material has a BET specific surface area of 0.5 $m^2$/g to 10 $m^2$/g.

7. A method for preparing the negative electrode active material according to claim 1, the method comprising:
   forming the silicon-containing composite particles comprising the pores from preliminary silicon-containing composite particles comprising $SiO_x$, wherein 0<x<2;
   forming the preliminary particles by disposing a polymer on the surface of the silicon-containing composite particles and in the pores;
   forming the carbon layer by subjecting the preliminary particles to a first heat treatment; and
   subjecting the preliminary particles in which the carbon layer is formed to a second heat treatment, wherein the second heat treatment is performed at a temperature in a range of 900° C. to 1,100° C.,
   wherein the polymer comprises carbon and the at least one metal selected from the group consisting of Li, Na and K.

8. The method of claim 7, wherein the forming of the silicon-containing composite particles comprising the pores from the preliminary silicon-containing composite particles comprises etching the preliminary silicon-containing composite particles.

9. The method of claim 7, wherein the polymer has a weight average molecular weight of 2,000 g/mol to 4,000,000 g/mol.

10. The method of claim 7, wherein the polymer comprises at least one selected from the group consisting of polyacrylic acid and polyvinyl alcohol.

11. The method of claim 7, wherein the first heat treatment is performed at a temperature in a range of 400° C. to 800° C.

12. A negative electrode comprising the negative electrode active material according to claim 1.

13. A secondary battery comprising the negative electrode of claim 12.

* * * * *